United States Patent
Kemp et al.

(10) Patent No.: US 8,371,697 B2
(45) Date of Patent: Feb. 12, 2013

(54) METHOD FOR IMAGE PROJECTION, IMAGE PROJECTION APPARATUS AND IMAGE PROJECTION SCREEN

(75) Inventors: Thomas Kemp, Esslingen (DE); Markus Kamm, Karlsruhe (DE)

(73) Assignee: Sony Deutschland GmbH, Berlin (DE)

(*) Notice: Subject to any disclaimer, the term of this patent is extended or adjusted under 35 U.S.C. 154(b) by 569 days.

(21) Appl. No.: 12/529,729

(22) PCT Filed: Mar. 5, 2008

(86) PCT No.: PCT/EP2008/001758
§ 371 (c)(1),
(2), (4) Date: Sep. 3, 2009

(87) PCT Pub. No.: WO2008/119430
PCT Pub. Date: Oct. 9, 2008

(65) Prior Publication Data
US 2010/0020290 A1    Jan. 28, 2010

(30) Foreign Application Priority Data

Mar. 31, 2007  (EP) .................................... 07006794

(51) Int. Cl.
| | |
|---|---|
| *G03B 21/14* | (2006.01) |
| *G03B 21/26* | (2006.01) |
| *G03B 21/56* | (2006.01) |
| *G03B 21/60* | (2006.01) |
| *H01J 1/62* | (2006.01) |
| *G02F 1/1335* | (2006.01) |

(52) U.S. Cl. ................ 353/31; 353/97; 353/84; 353/94; 359/450; 359/456; 313/489; 372/50.12; 349/71
(58) Field of Classification Search ............... 353/31, 353/97, 84, 94; 359/450, 456, 455; 313/489; 372/50.12; 349/71; 345/32, 213, 84, 694; 348/771
See application file for complete search history.

(56) References Cited

U.S. PATENT DOCUMENTS

| | | |
|---|---|---|
| 5,469,186 A | 11/1995 | Tanaka et al. |
| 2002/0122260 A1 | 9/2002 | Okazaki et al. |
| 2003/0185968 A1 | 10/2003 | Russ et al. |
| 2006/0132716 A1 | 6/2006 | Peeters et al. |

(Continued)

FOREIGN PATENT DOCUMENTS

| | | |
|---|---|---|
| CN | 1897072 A | 1/2007 |
| EP | 0 587 145 | 3/1994 |

(Continued)

OTHER PUBLICATIONS

Office Action issued Apr. 8, 2011 in China Application No. 200880011122.3 (English Translation).

(Continued)

*Primary Examiner* — Georgia Y Epps
*Assistant Examiner* — Magda Cruz
(74) *Attorney, Agent, or Firm* — Oblon, Spivak, McClelland, Maier & Neustadt, L.L.P.

(57) ABSTRACT

A method for image projection on a screen, including providing an image to be projected on the screen, determining excitation light representing the image, and illuminating with the excitation light at least one light excitable layer disposed on the screen, wherein the light excitable layer is configured to be stimulated for the emission of visible light based on the excitation light.

27 Claims, 7 Drawing Sheets

Slit mask with different fluorescent layers (sub-pixels)

Slit mask comprising different fluorescent layers FL1, FL2, FL3

Substrate

U.S. PATENT DOCUMENTS

| | | | |
|---|---|---|---|
| 2006/0221021 A1* | 10/2006 | Hajjar et al. | 345/84 |
| 2006/0262243 A1 | 11/2006 | Lester et al. | |
| 2007/0014318 A1 | 1/2007 | Hajjar et al. | |
| 2007/0046176 A1 | 3/2007 | Bukesov et al. | |
| 2007/0228927 A1* | 10/2007 | Kindler et al. | 313/495 |

FOREIGN PATENT DOCUMENTS

| | | |
|---|---|---|
| EP | 1 725 050 | 11/2006 |
| JP | 11 041548 | 2/1999 |
| JP | 2000-314920 | 11/2000 |
| JP | 2004-325874 | 11/2004 |
| JP | 2004-354763 | 12/2004 |
| JP | 2006-154443 | 6/2006 |
| WO | WO 2006/107720 | 10/2006 |

OTHER PUBLICATIONS

Chinese Office Action issued Feb. 29, 2012 in patent application No. 200880011122.3 with English translation.

Chinese Office Action Issued Sep. 3, 2012 in Patent Application No. 200880011122.3 (with English translation).

Japanese Office Action with English Summary mailed Oct. 2, 2012, in Japanese Patent Application No. 2010-501392.

* cited by examiner

METHOD FOR IMAGE PROJECTION, IMAGE PROJECTION APPARATUS AND IMAGE PROJECTION SCREEN

The invention relates to a method for image projection, to an image projection apparatus, and to an image projection screen.

BACKGROUND

Today, various application scenarios exist where an image is to be projected on a screen. For example, there exist television sets or similar devices, where an image is projected on a television screen. In such applications the images are projected on said screen from a rear side of the screen which is opposite to a front side of the screen that is viewed by the user.

On the other hand, there exist screens with front side projection where the image is projected on a screen and reflected by the screen to be viewed by the user. In such applications a projecting device (beamer) is on the same side of the screen as a user viewing the image.

It is an object of the invention to provide a method and apparatus for image projection on a screen achieving a high image quality.

This object is solved by a method for image projection, image projection apparatus and image projection screen.

Further details of the invention will become apparent from a consideration of the drawings and ensuing description.

DETAILED DESCRIPTION

In the following, embodiments of the invention are described. It is important to note, that all described embodiments in the following may be combined in any way, i.e. there is no limitation that certain described embodiments may not be combined with others.

Figure 1:
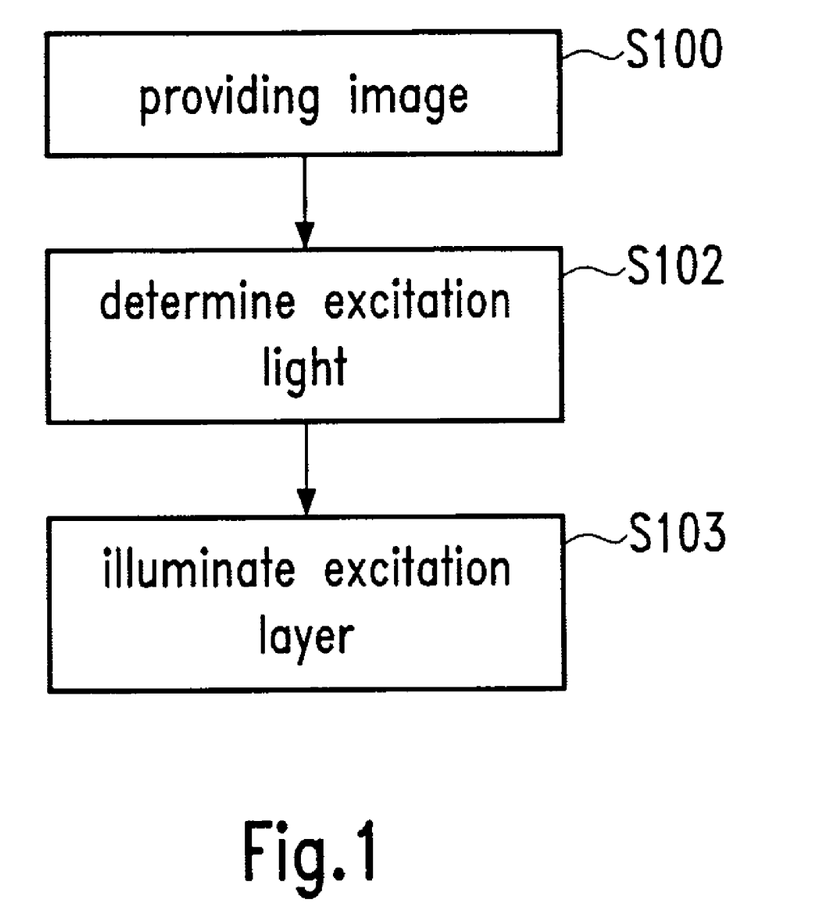
FIG. 1 shows steps of a method according to an embodiment of the invention.

FIG. 1 shows steps of a method for image projection according to an embodiment of the invention. In a first step S100, an image to be projected on a screen is provided. The image may e.g. correspond to a still image/picture or moving image/picture.

In a second step S102, excitation light is determined, wherein the excitation light represents the image. The excitation light may have a certain wavelength suitable to excite an excitation layer. Further, the excitation light may correspond to modulated light in order to represent the image.

In a third step S103, at least one light excitable layer is illuminated with said excitation light, the light excitable layer being disposed on the screen. The light excitable layer may be stimulated for the emission of visible light based on the excitation light.

It may be possible that the light excitable layer is e.g. a fluorescent and/or phosphorescent layer including a fluorescent and/or phosphorescent material configured to be stimulated for the emission of the visible light with e.g. ultraviolet.

When determining the excitation light representing the image in step S102, it may be possible to determine the excitation light as a scanning light beam representing the image line-wise. In other words, a scanning light beam may be used to excite different pixels, lines and/or regions of the light excitable layer in order to generate an image on the screen.

The excitation light may also represent a complete image. Thus, in step S102, the excitation light may be representing a complete image which may e.g. be provided by a liquid crystal display.

The excitation light may also be provided by a laser. The excitation light may be visible or non-visible light. It could also be possible to use other types of rays for exciting the excitation layer. The light excitable layer may disrupt the coherence of the laser light which may lead to a speckle reduction when compared to use a laser to project an image on the screen without light excitable layer. Thus, the image on said screen may be very sharp without any disturbing speckles.

Figure 2:
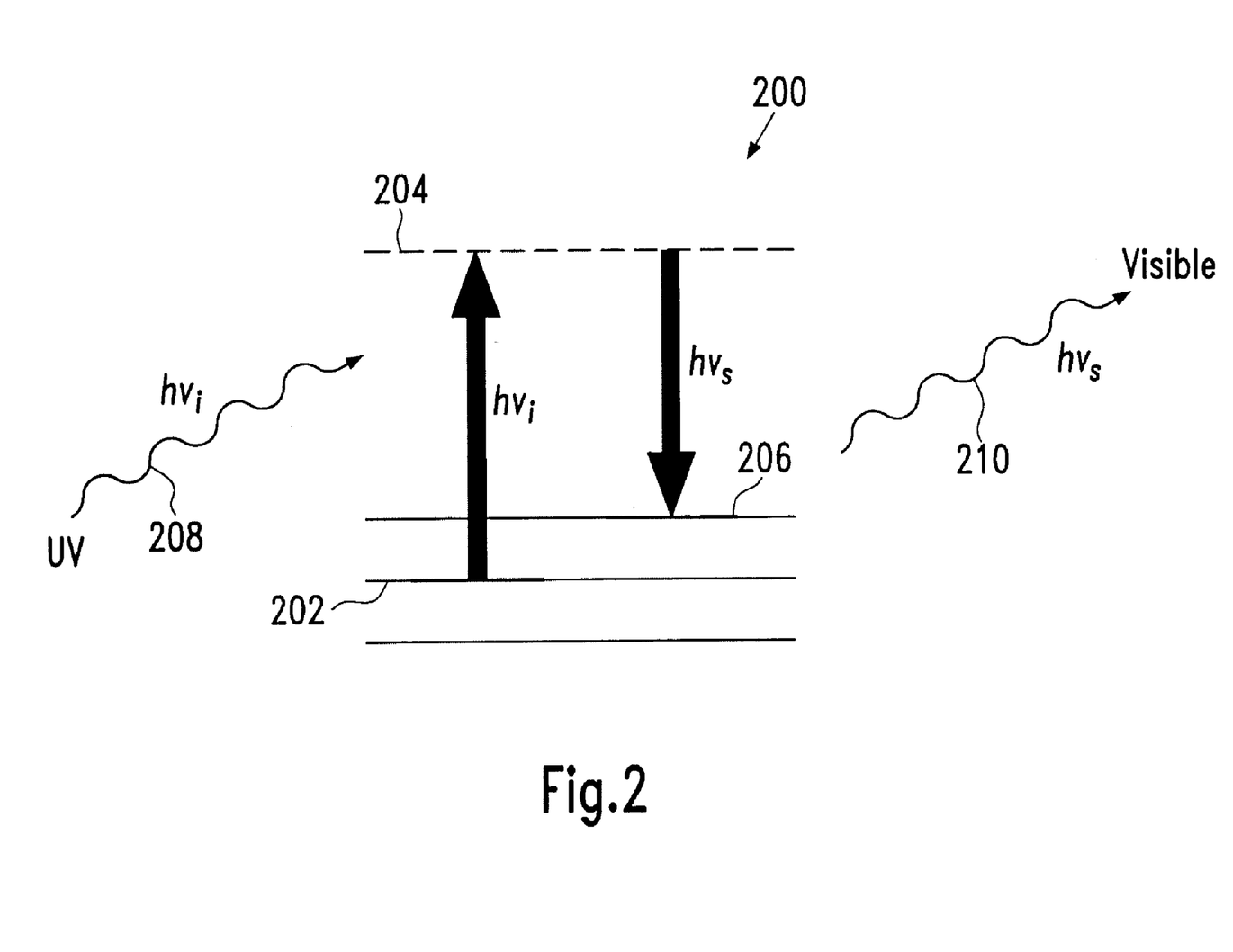
FIG. 2 shows an example of a light excitable layer.

FIG. 2 shows an example of a light excitable layer 200 comprising a first lower energy level (ground state) 202, higher energy level (intermediate level) 204 and second lower energy level 206.

When said light excitable layer 200 is illuminated with ultraviolet light 208, electrons of molecules and/or atoms of light excitable layer 200 are excited to said higher energy level 204. When the excited electrons drop to the second lower energy level 206, visible light 210 is emitted.

Thus, a photon $h\nu_i$ in the ultraviolet range is absorbed e.g. by a molecule and excites an electron from a ground state 202 into an unstable intermediate state 204. Subsequently, a photon $h\nu_s$ of lower energy in the visible (VIS) range is emitted via electron transition. Thus, visible light 210 is emitted.

An image projection apparatus and/or a screen according to an embodiment of the invention may comprise at least one such light excitable layer disposed on a screen. Then, a projection device may be used to generate the ultraviolet light (excitation light), wherein the excitation light represents an image to be displayed on the screen.

The projection device may be configured to generate the excitation light in the form of a scanning light beam representing the image to be displayed line-wise. The light excitable layer may e.g. be a fluorescent layer.

Figures 3A, 3B:
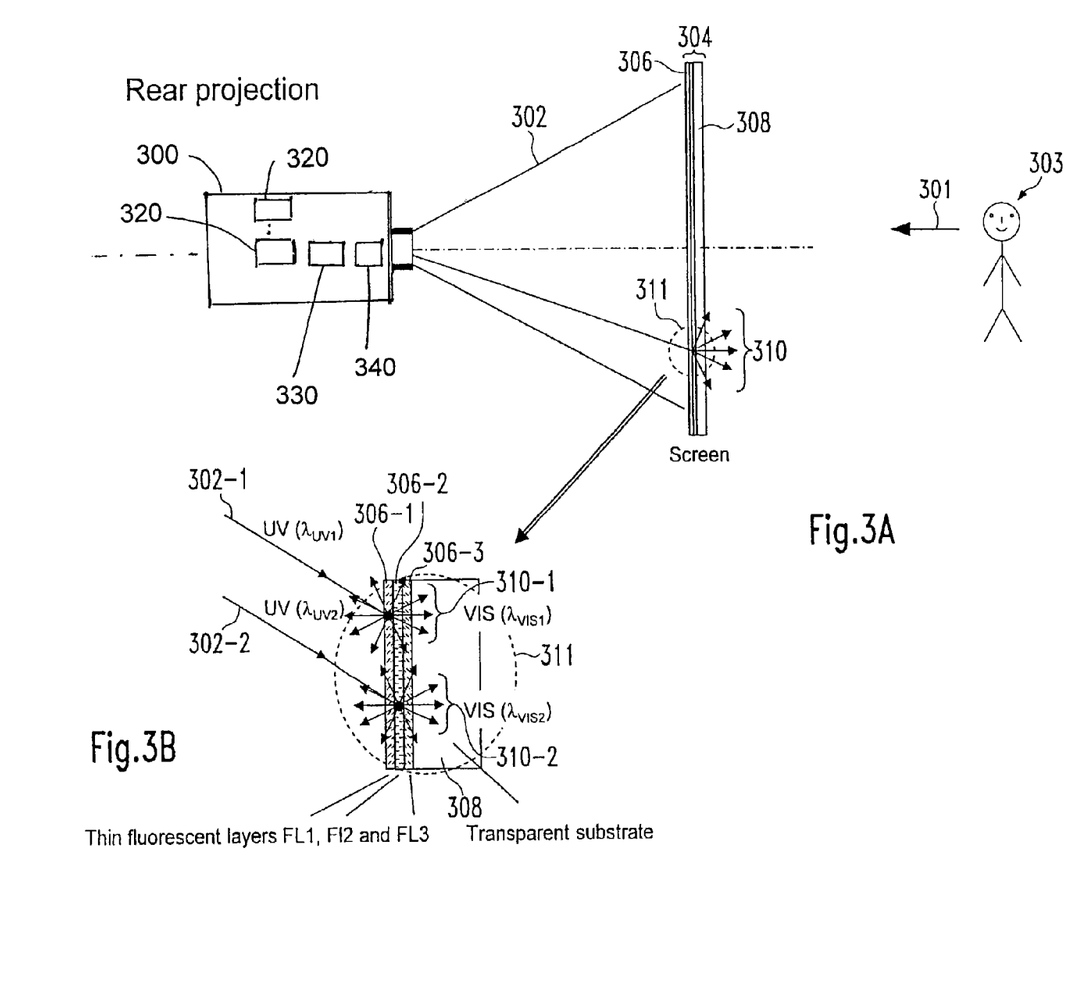
FIG. 3 shows an embodiment of the invention based on a rear projection.

FIG. 3A shows an exemplary embodiment according to a rear projection where a projector 300 is located behind a screen 304 when seen from a viewing direction 301 of a user 303.

The projector 300 emits ultraviolet light 302, e.g. generated by at least one ultraviolet laser, onto fluorescent layers 306 disposed on a substrate 308 of screen 304. The fluorescent layers 306 absorb ultraviolet light 302 thereby exciting the electrons of the molecules of the fluorescent layers into an intermediate state. Subsequently, scattered light 310 in the visible range is emitted via electron transition.

FIG. 3B shows an enlarged view of region 311 in FIG. 3A. As seen, the ultraviolet light 302 comprises first ultraviolet light 302-1 of a first wavelength $\lambda_{UV1}$, second ultraviolet light 302-2 of wavelength $\lambda_{UV2}$ and may comprise third ultraviolet light of wavelength $\lambda_{UV3}$ (not shown in FIG. 3B). The wavelengths $\lambda_{UV1}$, $\lambda_{UV2}$ and $\lambda_{UV3}$ are chosen to respectively excite electrons in a first fluorescent layer 306-1, second fluorescent layer 306-2 and third fluorescent layer 306-3. In other words, each of fluorescent layers 306-1, 306-2 and 306-3 are excitable by ultraviolet light of a different wavelength. Upon excitation, the fluorescent layers 306-1, 306-2, 306-3 emit first to third scattered light 310-1, 310-2, 310-3 of a wavelength in the visible range. First scattered light 301-1 may have a first wavelength $\lambda_{VIS1}$, second scattered light 310-2 may have a wavelength $\lambda_{VIS2}$ and third scattered light 310-3 may have a wavelength $\lambda_{VIS3}$. The wavelength $\lambda_{VIS1}$, $\lambda_{VIS2}$ and $\lambda_{VIS3}$ may correspond to respective color light. For example, first scattered light 310-1 may correspond to primary color "red" (R of the RGB color space). Further, second scattered light 310-2 may correspond to green light of the RGB color space and third scattered light 310-3 may correspond to blue colored light of the RGB color space.

Thus, according to the embodiment of FIG. 3, it is possible to generate a true color image based on mixing/controlling light emission of the first to third fluorescent layers 306-1, 306-2, 306-3.

As mentioned, the first to third ultraviolet light 302-1, 302-2, 302-3 may be provided by ultraviolet lasers scanning the rear surface of screen 304. In other words, in order to generate an image on said screen 304, different pixels, lines and/or regions of first to third fluorescent layers 306-1, 306-2, 306-3 are respectively excited by the first to third ultraviolet light 302-1, 302-2, 302-3.

At least second fluorescent layer 306-2 and third fluorescent layer 306-3 may be at least partly transparent such that first scattered light 310-1 generated in the first fluorescent layer 306-1 may be transmitted through the second and third fluorescent layers 306-2, 306-3 towards the front surface of screen 304 viewed by user 303.

It should be noted that projector 300 may also generate the ultraviolet light 302 to represent a complete image as opposed to a line-wise representation. In this case projector 300 may comprise light sources 320, micro shutter, and/or a liquid crystal display 330. Thus, projector 300 may generate the complete image in a similar way as known from beamers based on e.g. a micro-mirror display 340.

Figures 4A, 4B:
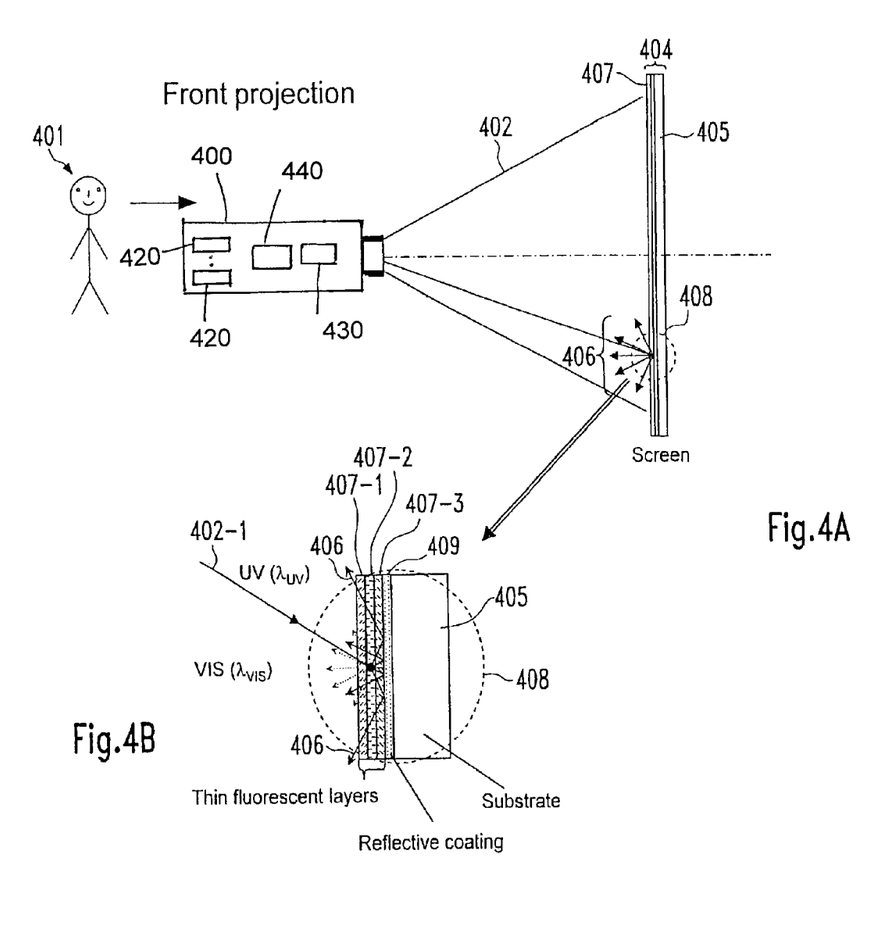
FIG. 4 shows an embodiment of the invention based on a front projection.

FIG. 4A shows an example of a front projection where a user 401 is located on the same side of a screen 404 as a projector 400 e.g. a beamer type device. Projector 400 emits ultraviolet light 402 of different wavelengths onto fluorescent layers 407 on a substrate 405 of screen 404. Ultraviolet light 402 excites electrons in the fluorescent layers 407 in order to emit visible light 406. Visible light 406 may e.g. be scattered light such that a pleasant picture is displayed to user 401 without any speckles or other distortions. Projector 400 may comprise light sources 420, a liquid crystal display 430, and a micro-mirror display 440.

FIG. 4B shows an enlarged view of region 408 of FIG. 4A. A light beam 402-1 of wavelength $\lambda_{UV}$ is emitted onto fluorescent layers 407 comprising a first to third fluorescent layer 407-1, 407-2, and 407-3. The wavelength $\lambda_{UV}$ of light beam 402-1 is configured to excite electrons of the second fluorescent layer 407-2, whereas electrons of first and third fluorescent layers 407-1, 407-3 are not excited. The excitation of electrons in second fluorescent layer 407-2 by light beam 402-1 leads to the emission of visible light 406 having a wavelength $\lambda_{VIS}$ in the visible range.

In order to enhance the illumination strength, it may be possible to provide a reflective coating 409 on substrate 405 of screen 404. Reflective coating 409 may reflect (specular or diffuse) all or a part of visible light 406 back into one hemisphere, i.e. towards user 401. In other words, reflective coating 409 may reflect at least a part of visible light 406 emitted in the direction towards substrate 405.

In the embodiment of FIG. 4B, first to third fluorescent layers 407-1, 407-2, 407-3 may be at least partly transparent in order to allow ultraviolet light 402 as well as visible light 406 to be transmitted.

Projector 400 may generate the ultraviolet light 402 with an ultraviolet laser. Further, the ultraviolet light 402 may represent an image to be projected on screen 404 line-wise or completely.

Figure 5:
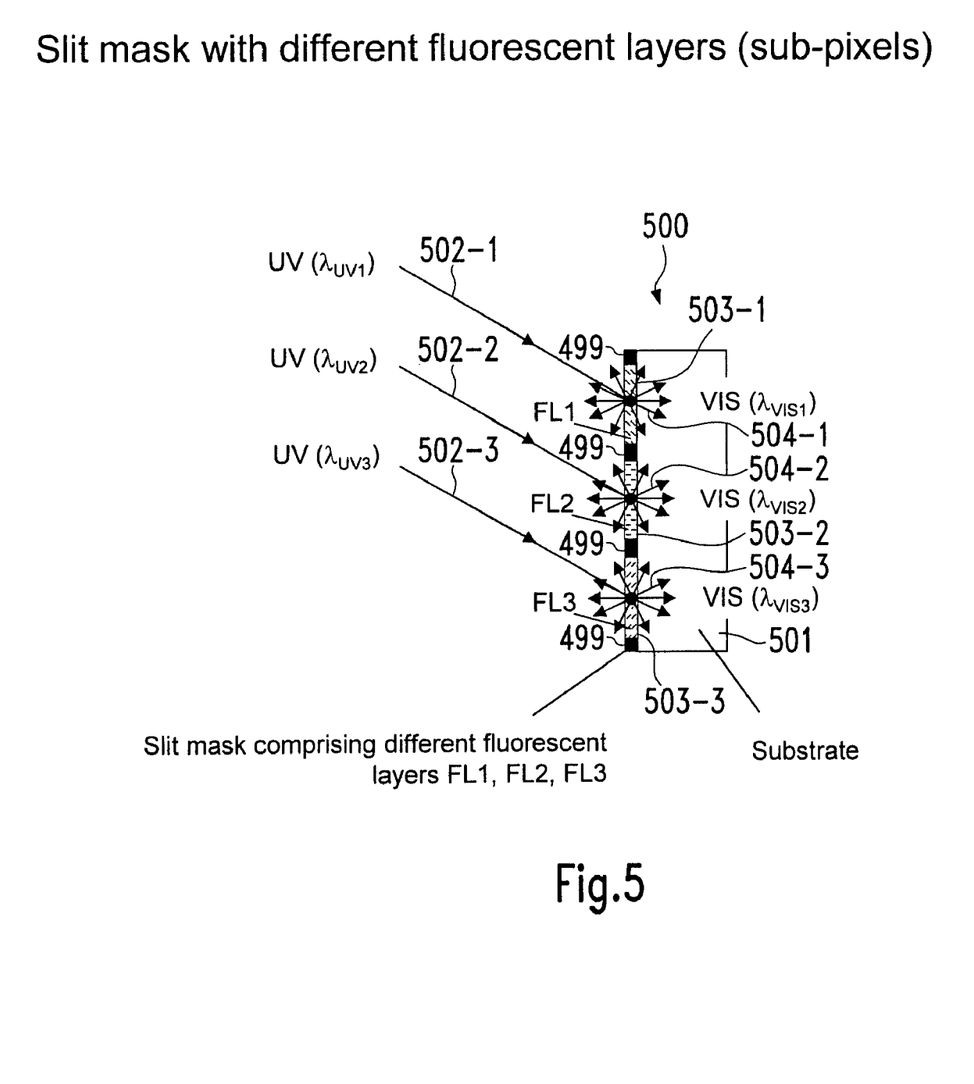
FIG. 5 shows an embodiment of the invention, wherein a mask comprising light excitable parts is used.

FIG. 5 shows a mask comprising different fluorescent layers also referred to as sub-pixels. Depending on the application, three sub-pixels may form one pixel of the image to be projected on the screen. Mask 500 may e.g. be a slit mask or point mask. The different fluorescent layers are e.g. arranged in holes of the mask.

Therefore, mask 500 comprises non-light transmitting regions 499 and fluorescent regions 503. Mask 500 is disposed on a substrate 501. In the example of FIG. 5, three fluorescent regions 503-1, 503-2, 503-3 are shown each respectively being formed of fluorescent material that is excitable by ultraviolet light of a certain wavelength. In the example of FIG. 5, first fluorescent region 503-1 is excitable by ultraviolet light 502-1 of wavelength $\lambda_{UV1}$. Second fluorescent region 503-2 is excitable by second ultraviolet light 502-2 of wavelength $\lambda_{UV2}$, and third fluorescent region 503-3 is excitable by third ultraviolet light 502-3 of wavelength $\lambda_{UV3}$. Thus, according to this embodiment, ultraviolet light of different wavelengths may be provided e.g. by three ultraviolet lasers emitting light of different ultraviolet light with different wavelengths $\lambda_{UV1}$, $\lambda_{UV2}$, $\lambda_{UV3}$.

First to third fluorescent regions 503-1, 503-2, 503-3 emit visible light 504 of different wavelengths. First fluorescent region 503-1 emits first visible light 504 of wavelength $\lambda_{VIS1}$. Second fluorescent region 503-2 emits second visible light 504-2 of wavelength $\lambda_{VIS2}$ and third fluorescent region 503-3 emits third visible light 504-3 of wavelength $\lambda_{VIS3}$.

First to third visible light 504-1, 504-2, 504-3 may correspond to red, green, and blue colored light, respectively, e.g. representing the primary colors of the RGB color space.

The mask 500 may be used in front and rear projection likewise.

Figure 6:
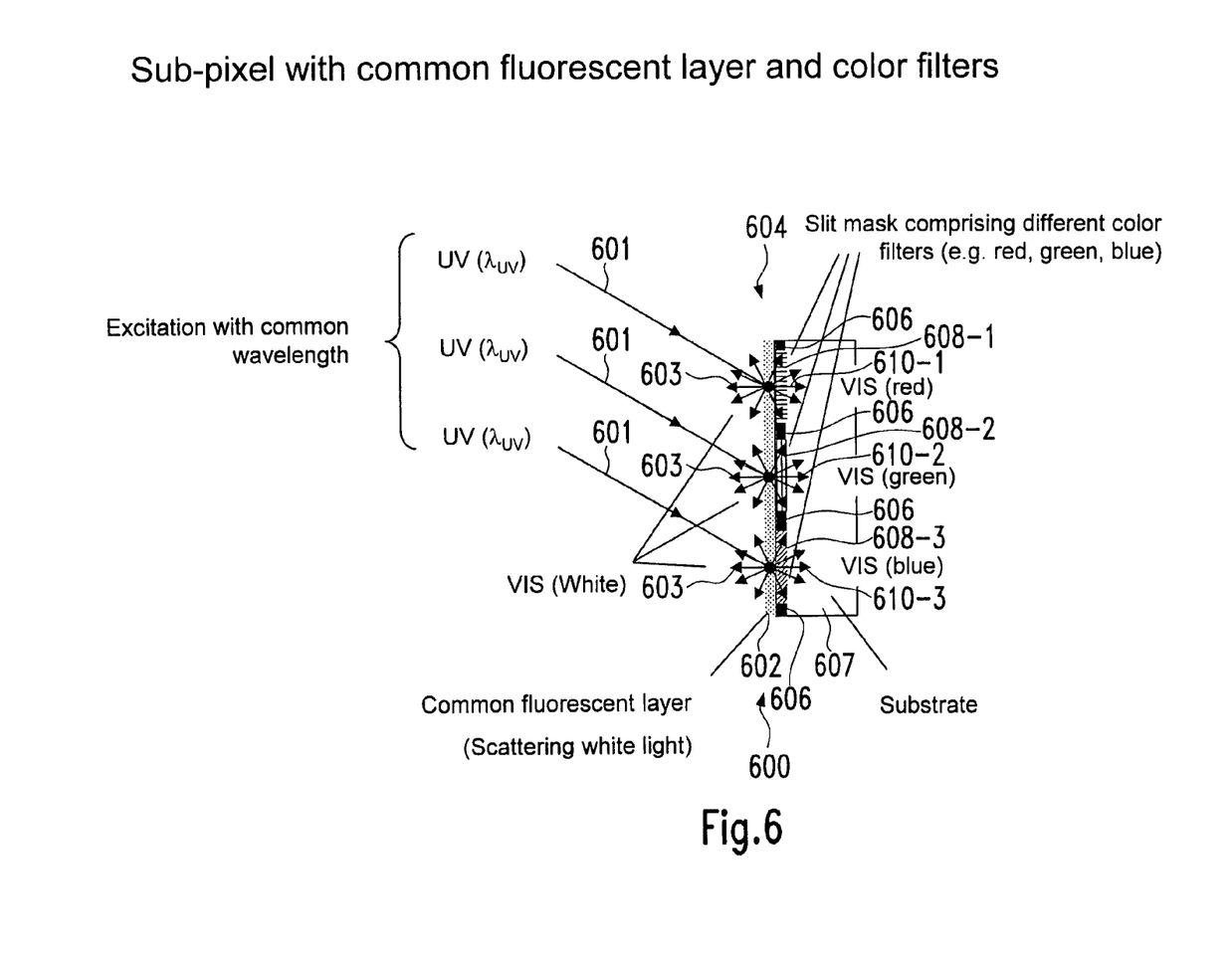
FIG. 6 shows a further embodiment of the invention comprising color filters.

FIG. 6 shows a further embodiment of the invention according to which a screen 600 comprises a fluorescent layer 602. Fluorescent layer 602 may be the only fluorescent layer and may excitable by ultraviolet light 601 of wavelength $\lambda_{UV}$. FIG. 6 depicts three ultraviolet light beams 601 of the same wavelength, wherein each of said light beams may excite a different pixel, line and/or region of fluorescent layer 602. The light beam 601 may be generated by a single laser of a projector, wherein the light beam 601 scans the surface of fluorescent layer 602 thus generating an image line-wise.

Screen 600 further comprises a mask 604 disposed on a substrate 607. As seen in FIG. 6, fluorescent layer 602 and substrate 607 sandwich mask 604.

Mask 604 comprises non-light transmitting regions 606 and color filters 608. The color filters 608 are configured to generate visible light of red, green, and blue color e.g. representing the primary colors of the RGB color space. In the example of FIG. 6, a first color filter 608-1 is configured to filter visible white light and thus generate visible red light 610-1. Further, a second color filter 608-2 is configured to filter visible white light to generate visible green light 610-2. Still further, a third color filter 608-3 is configured to filter visible white light to generate visible blue light 610-3.

Thus, according to the embodiment of FIG. 6, the visible white light that is generated upon excitation of fluorescent layer 602 may be filtered with different color filters 608 of said mask 604 in order to generate sub-pixels and/or pixels of an image to be generated on screen 600.

It should be noted that according to the embodiment of FIG. 6, a projector may only need to comprise one ultraviolet laser providing ultraviolet light of a single (common) wavelength $\lambda_{UV}$.

The visible white light 603 may e.g. correspond to scattered white light.

Depending on the application, the three color filters 608-1, 608-2 and 608-3 may form one image pixel of the image to be displayed on screen 600.

The screen 600 may be used in front and rear projection likewise.

Figure 7:
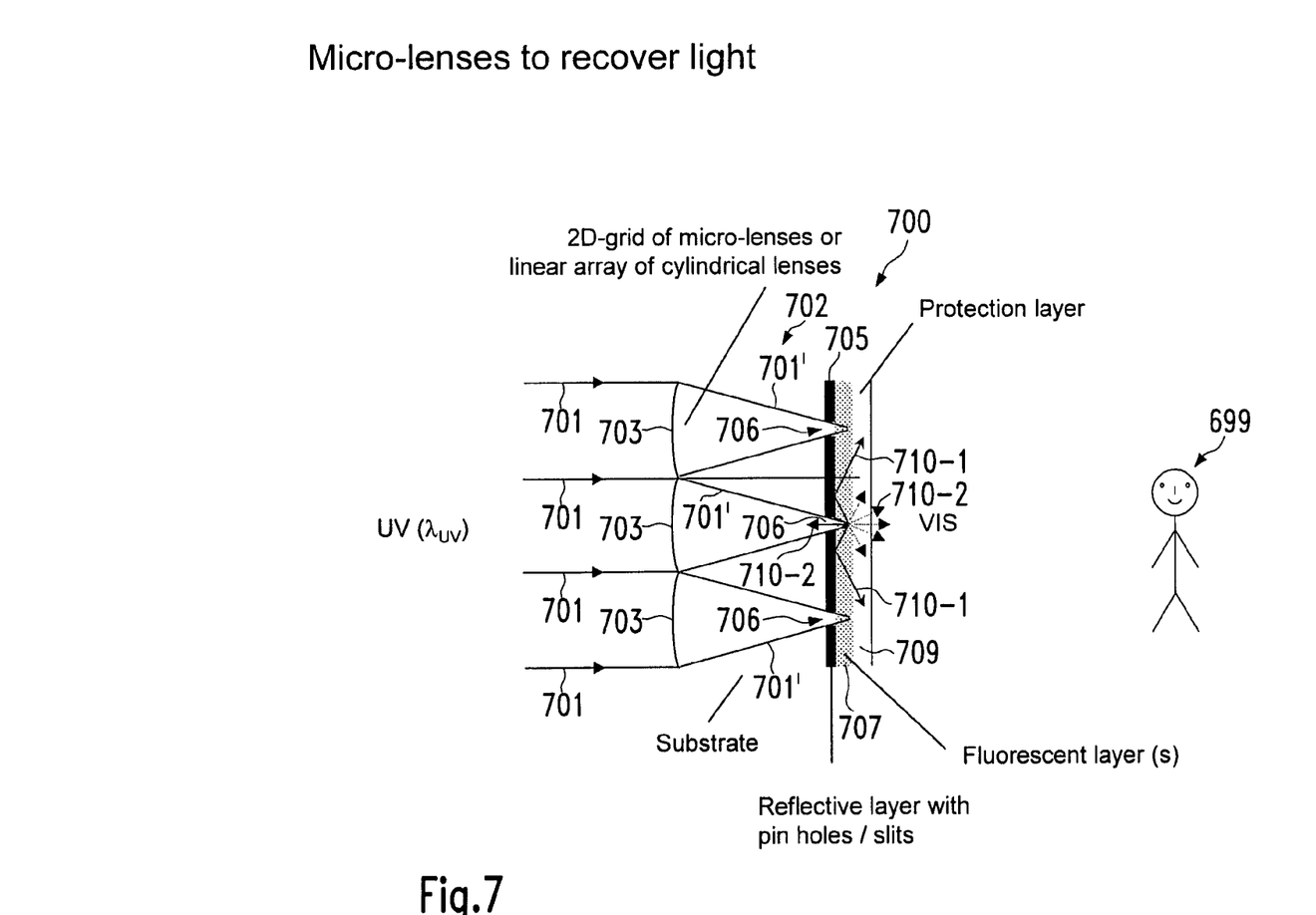
FIG. 7 shows a further embodiment of the invention wherein micro lenses are used and/or visible light is reflected by a reflective layer.

FIG. 7 shows a further embodiment of a screen 700 wherein micro lenses 703 are formed on a surface or in front of a substrate 702. Screen 700 further comprises a reflective layer 705 disposed on substrate 702. Reflective layer 705 comprises holes 706, e.g. pin holes or slits. Micro lenses 703 are arranged such that parallel ultraviolet light 701 is focused in holes 706. Thus, the efficiency and/or illumination strength of screen 700 may be improved. Also, a 360 degrees emission of light may be avoided.

On reflective layer 705, a fluorescent layer 707 is arranged. Fluorescent layer 707 emits visible light 710 upon excitation with focused ultraviolet light 701'.

Visible light 710 may comprise a reflected part 710-1 as well as a remaining part 710-2. The reflected part 710-1 corresponds to light emitted in the direction of reflective layer 705. Reflected part 710-1 is reflected by reflective layer 705 towards the viewing direction of a viewer 699.

In order to protect screen 700, a protection layer 709 may be disposed on fluorescent layer 707.

It should be noted, that also not shown in FIG. 7, the arrangement of micro lenses may be combined with the above-described embodiments, i.e. it may be possible that behind a hole 706 of mask 705, a fluorescent region is arranged, wherein the respective region is configured to generate red, green or blue colored light corresponding to one of the primary colors of the RGB color space. Also, it is possible that respective colored filters are arranged between protection layer 709 and fluorescent layer 707 filtering visible light 710 in order to generate light of red, green or blue color.

Micro lenses 703 may be arranged in a 2D-grid or according to a linear array of cylindrical lenses.

The arrangement of FIG. 7 may be used in front and rear projection likewise.

The invention claimed is:

1. An image projection apparatus, comprising:
a screen configured to display an image;
at least one light excitable layer disposed on said screen, wherein said light excitable layer is configured to be stimulated for the emission of visible light based on excitation light, said light excitable layer being a resonant scattering layer including a resonant scattering material configured to be stimulated for the emission of said visible light with said excitation light, wherein said excitation light and said visible light have approximately the same wavelength; and
a projection device configured to generate said excitation light, wherein said excitation light represents said image.

2. The image projection apparatus according to claim 1, wherein said projection device is configured to generate said excitation light in a form of a scanning light beam representing said image line wise.

3. The image projection apparatus according to claim 1, wherein said projection device is configured to generate said excitation light to represent a complete image.

4. The image projection apparatus according to claim 3, wherein said projection device includes a micro-mirror display configured to provide said complete image.

5. The image projection apparatus according to claim 3, wherein said projection device includes a liquid crystal display configured to provide said complete image.

6. The image projection apparatus according to claim 1, comprising at least one laser configured to provide said excitation light.

7. The image projection apparatus according to claim 6, comprising:
only one light excitable layer configured to emit white light upon excitation with said excitation light; and
a color filter disposed on said one light excitable layer configured to filter said white light and to output primary color light corresponding to the primary colors of the RGB color space.

8. The image projection apparatus according to claim 6, comprising:
only one light excitable layer configured to emit white light upon excitation with said excitation light; and
a mask disposed on said one light excitable layer, said mask including color filters configured to filter said white light and to output primary color light corresponding to the primary colors of the RGB color space.

9. The image projection apparatus according to claim 6, comprising:
three light excitable layers disposed on top of each other, said three light excitable layers being respectively configured to emit primary color light corresponding to the primary colors of the RGB color space.

10. The image projection apparatus according to claim 9, wherein at least two of said three light excitable layers are at least partly transparent.

11. The image projection apparatus according to claim 9, comprising:
three lasers each being respectively configured to emit light of a predetermined wavelength suitable to excite a respective one of said three light excitable layers.

12. The image projection apparatus according to claim 1, wherein said at least one light excitable layer is at least partly included in a mask.

13. The image projection apparatus according to claim 12, wherein at least three light excitable layers are included in said mask, and wherein each one of said three light excitable layers is respectively configured to generate visible light of red, green and blue color corresponding to the primary colors of the RGB color space.

14. The image projection apparatus according to claim 13, wherein each one of said at least three light excitable layers forms a sub-pixel of the image to be displayed on said screen.

15. The image projection apparatus according to claim 1, wherein said at least one light excitable layer includes a plurality of pixels of light excitable material, which is respectively configured to emit primary color light corresponding to the primary colors of the RGB color space.

16. The image projection apparatus according to claim 15, comprising a mask having holes, wherein said plurality of pixels is arranged in or below at least part of said holes.

17. The image projection apparatus according to claim 1, wherein said projection device is configured to illuminate said light excitable layer from a rear face of said screen, said rear face being opposite of a front face that is viewed by a user.

18. The image projection apparatus according to claim 17, wherein a reflective layer with holes is disposed on said rear face, said reflective layer having a reflecting surface facing towards said front face.

19. The image projection apparatus according to claim 17, comprising micro lenses configured to focus said excitation light with a focus essentially in a respective hole.

20. An image projection apparatus, comprising:
   a screen configured to display an image;
   at least one light excitable layer disposed on said screen, wherein said light excitable layer is configured to be stimulated for the emission of visible light based on excitation light;
   a projection device configured to generate said excitation light, said excitation light representing said image;
   said projection device being configured to illuminate said light excitable layer from a rear face of said screen, said rear face being opposite of a front face that is viewed by a user,
   the image projection apparatus further comprising a reflective layer with holes being disposed on the rear face of said screen, said reflective layer having a reflecting surface facing towards said front face, the at least one light excitable layer being formed on the reflecting surface of said reflective layers, the image projection apparatus further comprising micro lenses configured to focus said excitation light to corresponding holes.

21. The image projection apparatus according to claim 20, wherein said light excitable layer is a fluorescent and/or phosphorescent layer including a fluorescent and/or phosphorescent material configured to be stimulated for the emission of said visible light with said excitation light.

22. The image projection apparatus according to claim 20, further comprising at least one laser configured to provide said excitation light.

23. The image projection apparatus according to claim 22, wherein said at least one laser is an ultraviolet laser.

24. An image projection apparatus, comprising:
   a screen configured to display an image;
   three light excitable layers disposed on top of each other, disposed on said screen, said three light excitable layers being respectively configured to emit primary color light corresponding to the primary colors of the RGB color space based on excitation light; and
   a projection device comprising at least one laser configured to generate said excitation light, wherein said excitation light represents said image.

25. The image projection apparatus according to claim 24, wherein at least two of said three light excitable layers are at least partly transparent.

26. The image projection apparatus according to claim 24, comprising:
   three lasers each being respectively configured to emit light of a predetermined wavelength suitable to excite a respective one of said three light excitable layers.

27. The image projection apparatus according to claim 26, wherein said three lasers are ultraviolet lasers.

* * * * *